J. J. LISCH.
AUTOMATIC FISH HOOK.
APPLICATION FILED JAN. 8, 1910.

973,119.

Patented Oct. 18, 1910.

Witnesses
W. Thornton Bogert
E. M. McCallister

Inventor
Jacob J. Lisch
By Walter F. Murray
Attorney

UNITED STATES PATENT OFFICE.

JACOB J. LISCH, OF BELLEVUE, KENTUCKY, ASSIGNOR OF ONE-HALF TO FRANK J. GEVERTS, OF BELLEVUE, KENTUCKY.

AUTOMATIC FISH-HOOK.

973,119.      Specification of Letters Patent.      Patented Oct. 18, 1910.

Application filed January 8, 1910. Serial No. 536,977.

*To all whom it may concern:*

Be it known that I, JACOB J. LISCH, a citizen of the United States of America, and resident of Bellevue, Campbell county, State of Kentucky, have invented certain new and useful Improvements in Automatic Fish-Hooks, of which the following is a specification.

An object of this invention is to produce a fish hook, which operates automatically to secure the fish after it has taken the hook in its mouth.

A further object is to produce a hook in which means are employed for positively securing the fish without great injury to it and from which the fish may be easily taken.

A further object is the production of an automatic fish hook, which is actuated by the pressure exerted by the fish when it endeavors to take the bait.

These and other objects I attain by means of a hook embodying the features herein described and illustrated.

Figure 1:
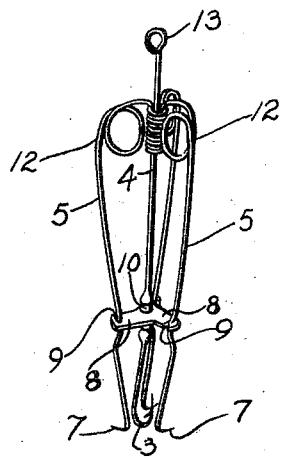
Figure 2:
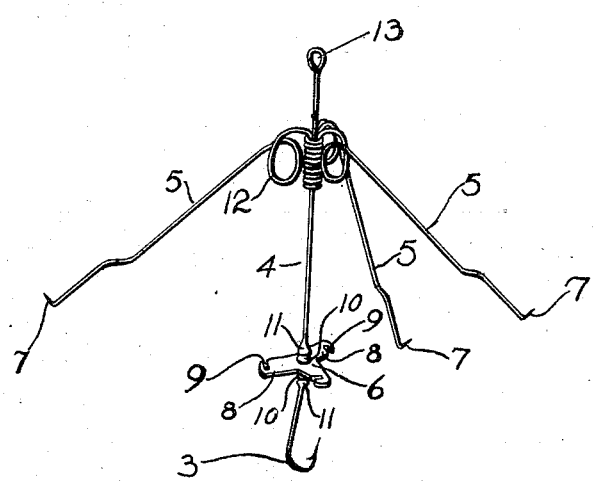

In the drawings accompanying this application and forming a part thereof, Figure 1 is a perspective view of a hook embodying my invention, and shown in the set or closed position. Fig. 2 is a perspective view of the hook shown in the sprung or open position.

The hook illustrated as an embodiment of my invention, consists of a bait hook 3 on the shank 4 of which three spring arms 5 are secured, and a swivel latch 6, which is rotatively mounted on the shank 4. The spring arms 5 are located 120 degrees apart on the shank 4, and each arm is provided at its free end with a prong 7, which extends outwardly substantially at right angles to the arm, and may be barbed if desired.

The latch 6 is provided with three extensions 8 and each extension is provided near its outer end with a notch 9, adapted to receive and hold one of the arms 5 in the set or closed position. The latch is held in place on the shank 4 between two beads 10, which are rotatively mounted on the shank and are in turn secured in place by collars or ridges 11, rigidly secured to the shank. With this construction, the latch turns easily and there is no tendency for it to stick. The notches 9 are so constructed, that a slight pressure on any one of the arms will release that arm and the other arms from the latch.

Each spring arm 5 is looped at 12, for the purpose of rendering it more flexible, and the arms are secured to the shank by any suitable means. An eyelet 13 is provided at the end of the shank to which the line may be secured.

When the arms 5 are held in the set or closed position by the latch 6 (as illustrated in Fig. 1), they project beyond the bait hook 3 and the prongs 7 project outwardly around the bait hook. When the arms are released by pressure on their free ends, unless restrained, they will spring outwardly, as shown in Fig. 2.

In setting the hook, the bait hook 3 is baited with live or any suitable bait and each arm is held in place by one of the notches 9 of the latch 6. The hook is then ready for use. When a fish endeavors to take the bait, it takes the ends of the arms 7 in its mouth and by a slight pressure releases these arms from the latch 6 and they then expand or spring outwardly. This causes the prongs 7 to catch in the fish's mouth and the fish can in no way release itself from the hook, because the tendency of each spring arm is to move outwardly and to force its prong 7 into the fish's mouth. An artificial bait may be secured to the shank 4.

The following advantages are obtained by my invention: The automatic operation of the hook is in no way dependent upon the pull of the fish line. The fish is not greatly injured by the hook and, in fact, may be caught without any apparent injury. The fish may be released from the hook and dropped into a receptacle by simply pressing the spring arms 5, so as to disengage them from its mouth. This may be done without touching the fish. There is little liability for the hook to catch in weeds or on snags, since the prongs 7 are not long and since the bait hook 3 is not exposed when the spring arms are set. If the hook does happen to catch on some foreign substance in the water, the effort of the fishermen to release it will in every instance release the spring arms 5 and they in springing outwardly will throw the hook free.

What I claim is:

1. A fish hook comprising a bait hook, spring arms which project beyond the bait hook when set, and a swivel latch independent, in operation, to the pull of the fish line, for holding said arms in the set position adjacent to the bait hook.

2. A fish hook comprising a bait hook, spring arms adapted to project beyond the bait hook when set, and means independent of the pull of the fish line for holding the spring arms in a set position adjacent to the bait hook.

3. A fish hook comprising a bait hook, spring arms secured to the shank of the bait hook and provided at their free ends with upwardly projecting prongs, and a swivel latch provided with notches adapted to receive said arms and to hold them in a set position, adjacent to the bait hook.

4. A fish hook comprising means for securing bait, a plurality of spring arms secured thereto, an outwardly projecting prong provided on each arm, an eyelet provided on the hook for securing the fish line, and means, independent of the pull of the fish line, for holding said arms in a set position.

5. A fish hook comprising means for securing bait, a plurality of spring arms mounted on said means and provided at their free ends with outwardly projecting prongs, and swivel latch, rotatively mounted on said means for securing bait, for holding the free ends of said spring arms in a set position.

6. A fish hook comprising a bait hook, spring arms secured thereto, and means released by pressure on the ends of the spring arms and independent of the pull of the fish line, for holding said spring arms in a set position, adjacent to the bait hook.

JACOB J. LISCH.

Witnesses:
  WALTER F. MURRAY,
  FRANK J. GEVERTS.